United States Patent [19]

Hoover et al.

[11] Patent Number: 5,693,163
[45] Date of Patent: Dec. 2, 1997

[54] INFLATED DUNNAGE AND METHOD FOR ITS PRODUCTION

[76] Inventors: Gregory A. Hoover, 700 Scotland St.; Roger A. Hoover, 2661 Crystal Cir., both of Dunedin, Fla. 34698; E. Riley Rowe, 519 White Oak Cir., Hartsville, S.C. 29550; David L. Rowe, 11904 E. Appaloosa Run, Raleigh, N.C. 27613

[21] Appl. No.: 659,576

[22] Filed: Jun. 6, 1996

Related U.S. Application Data

[63] Continuation-in-part of Ser. No. 317,760, Oct. 4, 1994, Pat. No. 5,552,003.

[51] Int. Cl.$^6$ ............................ B65B 61/00; B63B 25/24
[52] U.S. Cl. ...................... 156/147; 156/156; 156/292; 156/308.4; 53/472; 410/119
[58] Field of Search ............................ 156/147, 156, 156/198, 292, 308.4; 53/472, 474, 445; 410/119, 125

[56] References Cited

U.S. PATENT DOCUMENTS 3,254,828  6/1966  Lerner .
3,575,757  4/1971  Smith .
4,314,865  2/1982  Ottaviano .
4,354,004  10/1982  Hughes et al. .
4,904,092  2/1990  Campbell et al. .

*Primary Examiner*—Michael W. Ball
*Assistant Examiner*—Sam Chuan Yao
*Attorney, Agent, or Firm*—Dennison, Meserole, Pollack & Scheiner

[57] ABSTRACT

A method for producing inflated dunnage on the site of use, comprising providing, in web form, a plurality of preformed plastic bags, each of the bags comprising two plastic sheets in facing relationship and sealed along three edges with one edge remaining open. Air is blown toward each of the open edges in sequence, causing each bag to inflate, and the open edge of each inflated bag is sealed, the bag being empty except for the air. A plurality of sealed inflated bags is separated from the web and placed in a carton to serve as dunnage. The bags have a slip resistant outer surface which causes the bags to interlock in the carton and better protect objects therein from shock.

11 Claims, 2 Drawing Sheets

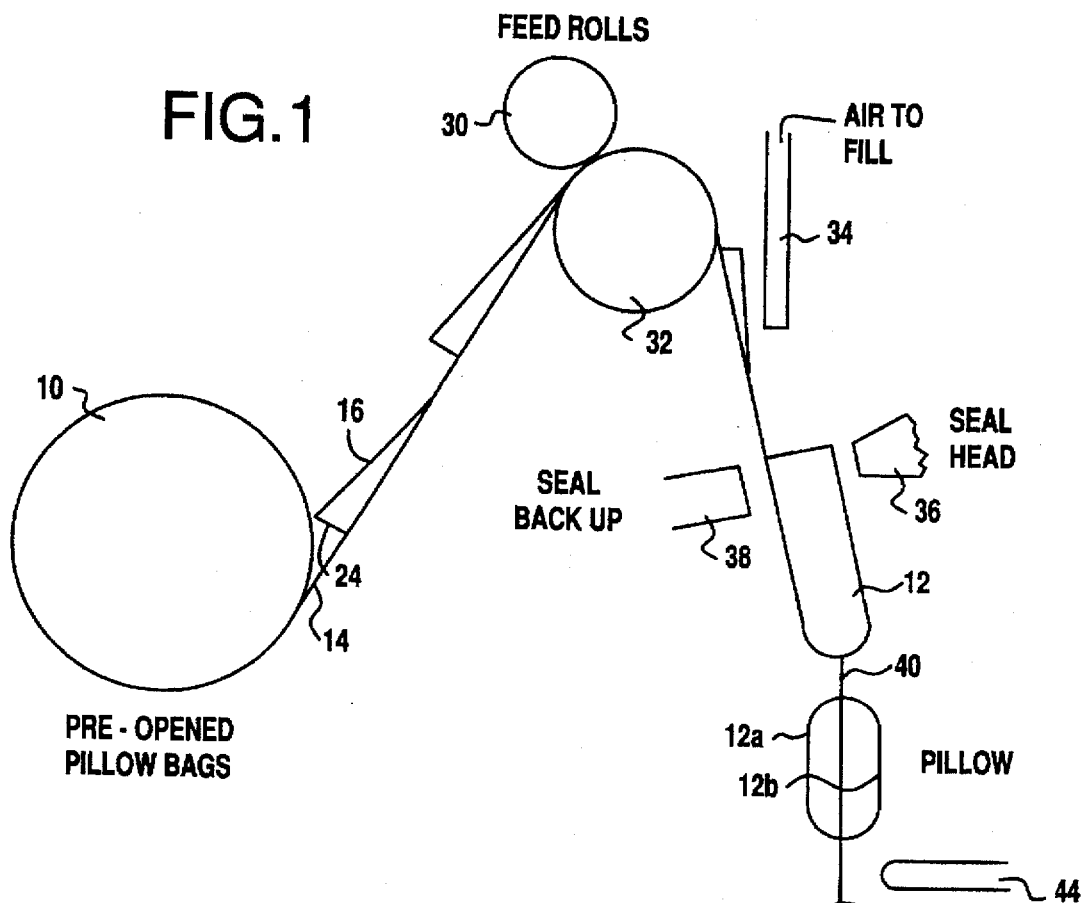
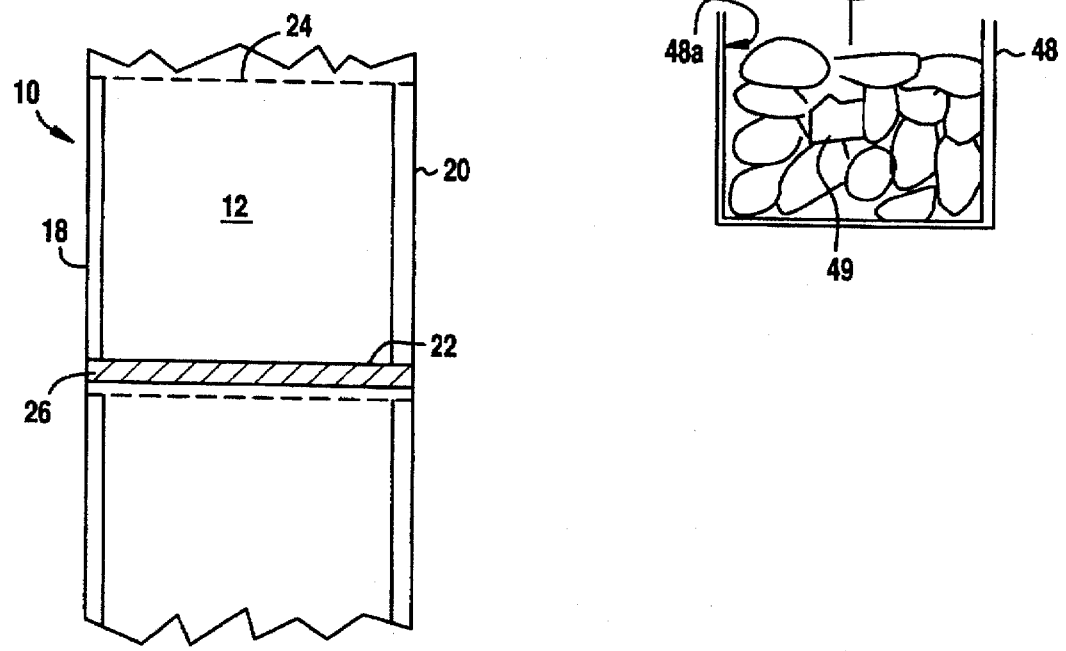

ically bubble wrap, from plastic sheets on an "on demand"
INFLATED DUNNAGE AND METHOD FOR ITS PRODUCTION This application is a continuation-in-part of Ser. No. 08/317,760 filed Oct. 4, 1994, now U.S. Pat. No. 5,552,003.

BACKGROUND OF THE INVENTION

The invention relates to a process for producing dunnage directly on the site of use, and the dunnage produced thereby.

Materials with low density and high volume are commonly used as packing materials to insulate goods being shipped from shock. Among the materials used are polystyrene "peanuts", "cups" and "worms," pellets of foam rubber, foam plastics and expanded polyurethane foam. Air cushioning material is generally preferred over the above types of dunnage because it is lighter in weight, can be supplied and dispensed in a controlled manner, particularly in web or folded form, and applied to the product to be shipped in sheet form. The sheet form of material is also easier to dispose of than the individual pieces of plastic dunnage after the product is removed, and the sheet form of material can be rewound for further use or disposed of by deflation.

However, air cushioning material also presents a variety of problems, as large volumes of the material must be kept on hand, and due to the necessity of shipping this material from the producer, shipping costs can be considerable.

In order to overcome these problems, devices have been proposed to produce sealed air dunnage on site from plastic sheets. U.S. Pat. Nos. 5,188,691, 5,203,761, and 4,576,669 all propose devices for producing air filled dunnage, typically bubble wrap, from plastic sheets on an "on demand" basis.

U.S. Pat. No. 3,575,757 discloses a process for producing dunnage on site from plastic sheets in which opposed sheets are bonded together in a U-shaped seal to form a pocket, the pocket is inflated and then sealed by the formation of a subsequent U-shaped seal.

However, the above methods of producing dunnage are somewhat disadvantageous, as the apparatus necessary to handle two separate sheets of plastic is somewhat complex and difficult to operate. When used on site, it is typically operated by people whose expertise is not in the production of dunnage and who have some difficulty operating the equipment at peak efficiency.

SUMMARY OF THE INVENTION

It is therefore an object of the invention to produce dunnage on site in a simplified manner.

It is a further object of the invention to provide dunnage on site by a method which can be operated easily by personnel without expertise in the production of dunnage.

To achieve these and other objects, the present invention provides a method for producing dunnage comprising the steps of providing, in web form, a plurality of preformed plastic bags, each of the bags comprising two plastic sheets in facing relationship and sealed along three edges thereof with one edge remaining open, the bags having slip resistant outer surface and being releasably attached in sequence along two opposed edges, blowing air toward each said open edge causing each bag to inflate in sequence, sealing the fourth edge of each inflated bag, the bag being empty except for air during the sealing operation, separating sealed inflated bags from the web of bags and placing a plurality of separated sealed bags in a carton to serve as dunnage.

Applicants have discovered that it is far more difficult to produce a web of plastic bags than it is to convert a web of plastic bags to inflated dunnage. Therefore, according to the method of the invention, a web of preformed bags is manufactured separately by those with the greatest expertise. This web of bags is formed by placing a plastic sheet in facing relationship with another plastic sheet and forming a plurality of bags along the sheets by sealing along three edges with one edge remaining open. The plurality of bags is packaged, such as by rolling up or fan-folding, and transported to the site where the dunnage is to be produced.

Applicants have further discovered that by making the surface of the bags slip resistant, the dunnage which is produced with such bags will interlock in use and serve to better protect objects contained with the dunnage from shock. Accordingly, the invention further relates to a container containing a plurality of inflated and sealed plastic bags, the bags having an outer surface which is slip resistant and thereby causes the bags to interlock around the object to be protected.

In addition, applicants have discovered that the interlocking of the bags increases the volume of air between the bags, and thereby reduces the number of bags necessary to fill a carton of given volume. While the amount of the reduction may vary, in one instance the number of bags necessary was reduced by 12%.

In order to further reduce the number of bags necessary to fill a carton, it is possible to coat or line the carton with a slip resistant material.

Typically, a web of bags will be provided to the site where dunnage is to be produced which is segmented longitudinally, but a web can also be provided which is segmented both longitudinally and laterally, to produce a web with, for example, four bags across or eight bags across. The bags can be separated from the web individually and placed in a carton, or can be separated in groups of at least two bags, and typically more. This is advantageous, as the dunnage which is produced can be wrapped around an object and taped together just as bubble wrap would be, and which is as easy to dispose of or reuse as bubble wrap (or even easier). The inflated dunnage of the invention is, however, much easier to produce than bubble wrap.

A variety of techniques and materials may be used to manufacture the slip resistant bags of the invention. The term "slip resistant" is intended to apply to several different surface conditions from highly tacky and adhesive to simply co-adhesive, where the bags are not tacky at all, but adhere to each other only.

One layer or mono-film extrusion is the most basic method for forming a slip resistant surface. There are many plastics that are slip resistant in their natural unaltered state, the most common of which is low density polyethylene. Low density polyethylene is commonly manufactured with additives that increase its "slip" but the invention can utilize low density polyethylene without such additives. While use of a single layer of slip resistant polyethylene is possible according to the invention, it is not preferred as bags formed of a single layer of this material are slip resistant on the inner surface as well as the outer surface, and the surfaces are therefore difficult to separate for inflation.

It is possible to obviate this problem by co-extruding two or more polymer layers from separate extruders and joining the co-extruded polymers in a single film. In this way a bag could be formed with a slip resistant low density polyethylene outer surface, and a low density polyethylene with slip additives for the inner surface.

Similarly, two or more layers of polymers with different slip properties can be laminated together with a layer of adhesive therebetween. Further, lamination and coextrusion can be used in combination.

There are several other less preferred methods for reducing slip including corona discharge, flame treatment and embossing.

Finally, it is possible to coat the outer surface to reduce slip or the inner surface to increase slip, typically with a spray or a roller. Most often, this involves coating an adhesive material on the outer surface of the bags; in fact it is known from U.S. Pat. No. 4,904,092 to coat the outer surface of plastic grocery bags with at least a pattern of adhesive in order to make them easier to hand open.

Among the other materials which can be used to form bags are nylon film and high density polyethylene. Nylon film will keep air trapped for a long period of time, while high density polyethylene is strong and also holds air for a long period of time. However, low density polyethylene tends to be inexpensive and will typically be used for the slip resistant outer surface. The thickness of the films can be adjusted to provide extra strength or light weight, depending on which properties are desired.

It is also possible to produce the plastic film with degradable additives in order to aid in disposal.

Importantly, the apparatus used to inflate and seal plastic bags is well known and easy to operate. Typically, an air filled sealed bag will be used for packaging a small article. In this regard, U.S. Pat. Nos. 3,254,828, 3,298,156 and 3,477,196 are cited as representative patents showing methods and apparatus for blowing open bags on rolls, and U.S. Pat. No. 4,103,471 is cited to show an apparatus for packaging materials in a protective atmosphere, in which a foodstuff is packaged in a bag under an inert atmosphere and the bag is then sealed.

In an additional embodiment of the invention, the starting material is not a web of plastic bags, but rather a stock material comprising two plastic sheets in facing relationship which are sealed together along the longitudinal outer edges, or a single sheet sealed into tubular form. This stock material is unpackaged and a first lateral seal is placed across the material. Unpackaging is then continued, and an inflation needle punctures one of the plastic sheets. Air is blown through the needle, causing an inflated "pillow" to form at least between the needle and the seal. In carrying out this process, the inflated area actually extends back as far as the point which there is pressure keeping the facing plastic sheets from separating, either at the stock material itself or at rollers assisting in the unpackaging of the stock material.

After a pillow is formed, the needle is withdrawn from between the sheets, and substantially simultaneously, another lateral seal is formed across the area from which the needle was removed. Each seal thus forms an inflated pillow, and the seals can be cut at predetermined intervals to form pillow units to be placed in a carton as dunnage.

In a particularly preferred embodiment of the invention, the stock material has one or more centrally located longitudinal seals in addition to the edge seals. Multiple inflation needles will then be used, with one needle being needed to inflate a longitudinal section. The end result is multiple longitudinal pillow units.

BRIEF DESCRIPTION OF THE DRAWINGS

FIG. 1 is a schematic diagram of a first method for forming inflated dunnage;

FIG. 2 is a plan view of a roll of plastic bags used in the first method;

DESCRIPTION OF THE PREFERRED EMBODIMENTS

Figure 3:
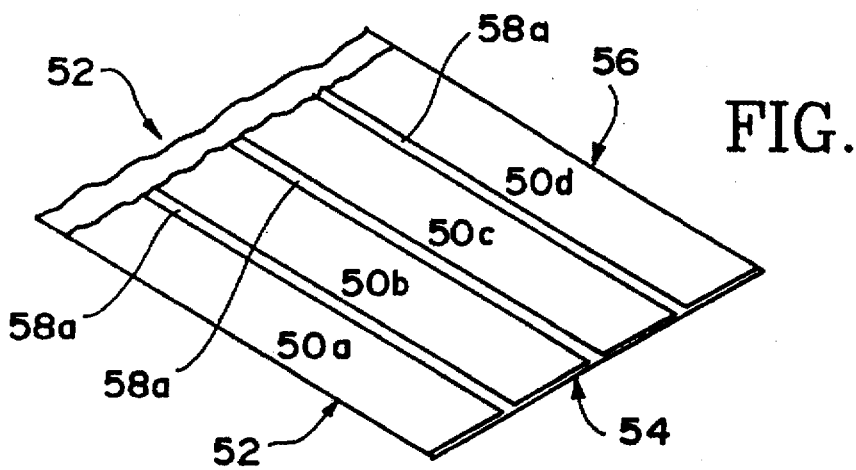
FIG. 3 is a plan view of a stock material used in a second method for preparing inflated dunnage.

As shown in FIG. 1, the starting material of the process is a roll 10 of plastic bags, the roll comprising a backing sheet 14 and a facing sheet 16. The roll of bags is shown in detail in FIG. 2, each bag 12 formed from a first longitudinal seal 18, a second longitudinal seal 20 and a lateral seal 22. Edge 24 is not sealed. Outer surface 12a is slip resistant; inner surface 12b is more slippery than outer surface 12a to make the bags easier to open. The roll of bags passes between feed rolls 30 and 32, the rolls creating enough tension to cause a slight opening in edge 24. Air tube 34 blows air at slightly opened edge 24, as the bag passes the tube, causing the bag 12 to inflate. The bag then passes between seal head 36 and seal backup 38, which places a lateral seal 40 across edge 24 of the bag. The bags then pass a separating station 44 which is activated at predetermined intervals to cut across lateral seal 40 and form an individual sealed bag 12s, or a unit with multiple sealed bags.

The roll of bags 10 may be provided with lateral perforations 26 in order to simplify the separation of the sealed bags.

A plurality of sealed bags 12s is placed in carton 48 lined internally with a layer of slip resistant low density polyethylene 48a, where the bags serve to protect an object 49. Because outer surfaces 12a of bags 12s are slip resistant, the bags interlock in use, and object 49 does not move after the carton 48 is filled and sealed.

This method of forming the sealed bags is highly advantageous, as the relatively difficult job of sealing three edges of each bag is done beforehand on a central facility which specializes in the manufacture of plastic bags. Only rolls of plastic bags must be shipped, the rolls taking up little volume compared with the final dunnage. The dunnage itself is formed on site in only the quantity necessary and is formed with equipment which need be capable of handling only a single roll, placing only a lateral seal across the roll and cutting.

In an alternate embodiment of the invention, shown in FIG. 3, the starting material is not a roll of bags, but a roll formed of a stock material 52 sealed along longitudinal edges 52 and 56. Lateral starting edge 54 may be sealed beforehand, or may be left open and sealed during the process. In addition to the seals of longitudinal edges 52 and 56, central longitudinal seals 58a, 58b, and 58c may optionally be placed in the material, thus creating pockets 50a, 50b, 50c and 50d.

Figure 4:
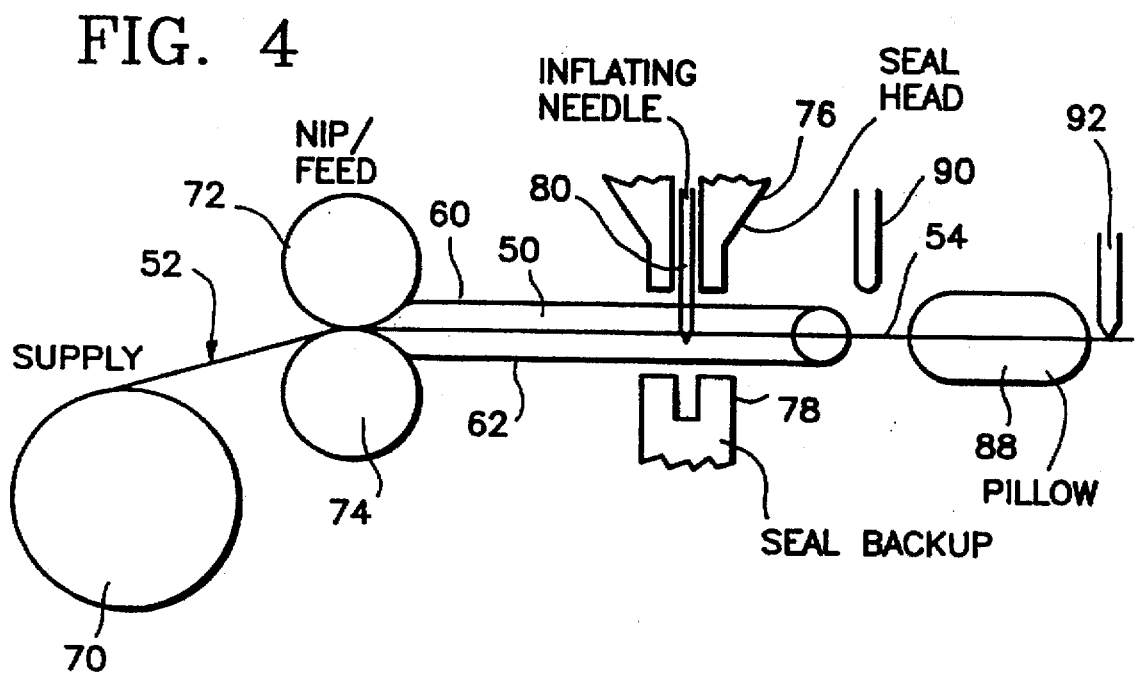
FIG. 4 is a schematic view of a second method for producing inflated dunnage.

Inflated dunnage is formed from this stock material as shown in FIG. 4. The stock material 52 is unrolled from a roll 70 between feed rolls 72 and 74. A seal head 76 and seal backup 78 are located downstream of the feed rolls, and a retractable inflation needle 80 is part of the seal head.

As noted, a starting lateral edge 54 of the feed material may be presealed, or it may be sealed in starting the process using seal heads 76 and seal backup 78. After the formation of that seal, the stock material continues to be unrolled, and at a predetermined point, inflation needle 80 is extended to puncture top sheet 60 of the stock material 52, but not puncture bottom sheet 62. Air is blown through the inflation needle, inflating pocket 50 between sealed edge 54 in the inflation needle, but in practice, the inflated area extends back as far as the feed rolls. In a substantially simultaneous manner, the needle is withdrawn, and seal head 76 and seal backup 78 interact to form a lateral seal across the stock material. Optionally, a perforation head 90 may be provided just after the seal head and backup to form perforations between the pillows as they are formed. The result is the formation of pillows 88, and cutting station 92 is located downstream of the sealing and inflation apparatus to cut across the lateral seals at predetermined intervals to form pillow units which can be placed in cartons.

Figure 5:
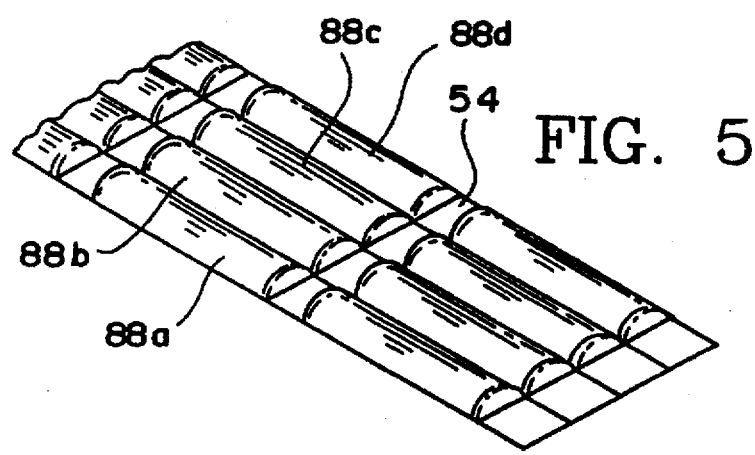
FIG. 5 is a plan view of the inflated dunnage prepared by the second method.

When the stock material includes multiple longitudinal seals, the result is the pillow units shown in FIG. 5, including multiple longitudinal pillows 88a, 88b, 88c and 88d. The longitudinal pillow units are separated by a lateral seal 54. Normally, several lateral seals 54 will be left intact, to create a pillow unit including two or more longitudinally attached pillow units. A multiple pillow unit as described, including several lateral seals, is flexible both longitudinally and laterally, and can effectively be wrapped around a large object.

What is claimed is:

1. Method for producing dunnage, comprising the steps of:

a) sealing a first plastic sheet to a second plastic sheet so as to form a web comprising a plurality of bags, each of said bags comprising said first and second plastic sheets in facing relationship and sealed along three edges thereof with one edge remaining open, said bags having a slip resistant outer surface and being releasably attached to each other along two opposed edges;

b) packaging said web of bags;

c) providing said web of bags at a site where dunnage is to be produced;

d) unpackaging said web of bags at said site, and blowing air towards each said open edge in sequence, causing each said bag to inflate;

e) sealing the open edge of each said inflated bag, said inflated bag being empty except for air of inflation;

f) separating a plurality of sealed inflated bags from said web of bags; and g) placing said plurality of separated, sealed bags in a container to serve as dunnage, whereby said slip resistant outer surface causes said plurality of bags to interlock in said container.

2. Method according to claim 1, wherein the bags are releasably attached by segmenting the web of bags longitudinally at predetermined intervals.

3. Method according to claim 2, wherein the web of bags is segmented both longitudinally and laterally.

4. Method according to claim 1, wherein said bags are separated in groups of at least two bags to form dunnage units.

5. Method according to claim 1, wherein the open edge is sealed with heat.

6. Method according to claim 1, wherein said plastic sheets comprise low density polyethylene.

7. Method according to claim 1, wherein said plurality of bags have an inner surface which is less slip resistant than said outer surface.

8. Method according to claim 7, wherein said first and second plastic sheets are formed by co-extruding plastic layers of differing slip.

9. Method according to claim 7, wherein said first and second plastic sheets are formed by laminating together plastic layers of differing slip.

10. Method according to claim 7, wherein the outer surface of said plurality of bags is coated with adhesive to increase slip resistance.

11. Method according to claim 1, wherein said web of bags is packaged by rolling up and unpackaged by unrolling.

* * * * *